United States Patent

Muta

[11] Patent Number: 5,211,102
[45] Date of Patent: May 18, 1993

[54] KNOCK PIN ARRANGEMENT FOR PISTON RING

[75] Inventor: Hisakazu Muta, Kanagawa, Japan

[73] Assignee: Atsugi Unisia Corp., Kanagawa, Japan

[21] Appl. No.: 795,705

[22] Filed: Nov. 21, 1991

[30] Foreign Application Priority Data

Nov. 27, 1990 [JP] Japan ............................ 2-124520[U]

[51] Int. Cl.$^5$ ................................................ F16J 1/04
[52] U.S. Cl. ........................................ 92/208; 92/172; 277/136; 123/193.6
[58] Field of Search ................ 92/172, 208; 277/136; 123/193.6

[56] References Cited

U.S. PATENT DOCUMENTS

| 920,237 | 5/1909 | Allen | 277/136 |
| 1,844,412 | 2/1932 | Smith | 277/136 |
| 2,412,734 | 12/1946 | Iliffe | 277/136 |
| 3,656,766 | 4/1972 | Geffroy | 277/136 |

FOREIGN PATENT DOCUMENTS

| 650241 | 9/1937 | Fed. Rep. of Germany | 277/136 |
| 857751 | 9/1940 | France | 277/136 |
| 59-215942 | 12/1984 | Japan. | |
| 431488 | 7/1935 | United Kingdom | 277/136 |

*Primary Examiner*—Thomas E. Denion
*Attorney, Agent, or Firm*—Bachman & LaPointe

[57] ABSTRACT

In a piston, a circumferential groove for a piston ring, a knock pin being inserted in a bore set radially relative to the piston ring groove. A head end of the knock pin protrudes into a space defined by the piston ring groove for interposing between ends of a piston ring for preventing turning, or rotation, thereof. Means for preventing mechanical interference between the walls of the piston ring groove and the head end of the knock pin is provided.

9 Claims, 2 Drawing Sheets

KNOCK PIN ARRANGEMENT FOR PISTON RING

BACKGROUND OF THE INVENTION

1. Field of The Invention

The present invention relates generally to a piston. Particularly, to a piston for an internal combustion engine which is provided with a knock pin located in a bore provided in the face of a piston ring groove.

2. Description of The Background Art

Conventionally, pistons for internal combustion engines have been proposed which utilize knock pins for preventing rotational movement of a piston ring. One such conventional piston is disclosed in Japanese Patent Application (First Unexamined Publication) 59-215942. This document relates to an aluminum alloy piston provided with a knock pin opening in the bottom of a circumferential piston ring groove. A tail end of the knock pin is fitted into the opening and a head end engages with portions of a piston ring, to prevent turning or rotation of the piston ring.

With this arrangement, factors such as movement of the knock pin within the knock pin bore as well as engine running duration, temperature and piston expansion, cause stress to be applied to the knock pin, particularly to the head end, resulting in repeated springback of the knock pin according to changing operating conditions. This can lead to breakage or deformation of the knock pin.

SUMMARY OF THE INVENTION

According to the present invention, there is provided a piston comprising: a piston head formed with a piston ring groove and a knock pin bore, the piston ring groove having upper and lower walls and an inner wall which cooperatively define the piston ring groove, the knock pin bore being communicated with the piston ring groove; a knock pin received in the knock pin bore and having a head end protruding from the knock pin bore into the piston ring groove; means for preventing mechanical interference between the head end of the knock pin and the upper, lower, and inner walls of the piston ring groove.

DESCRIPTION OF THE PREFERRED EMBODIMENT

Figure 1:
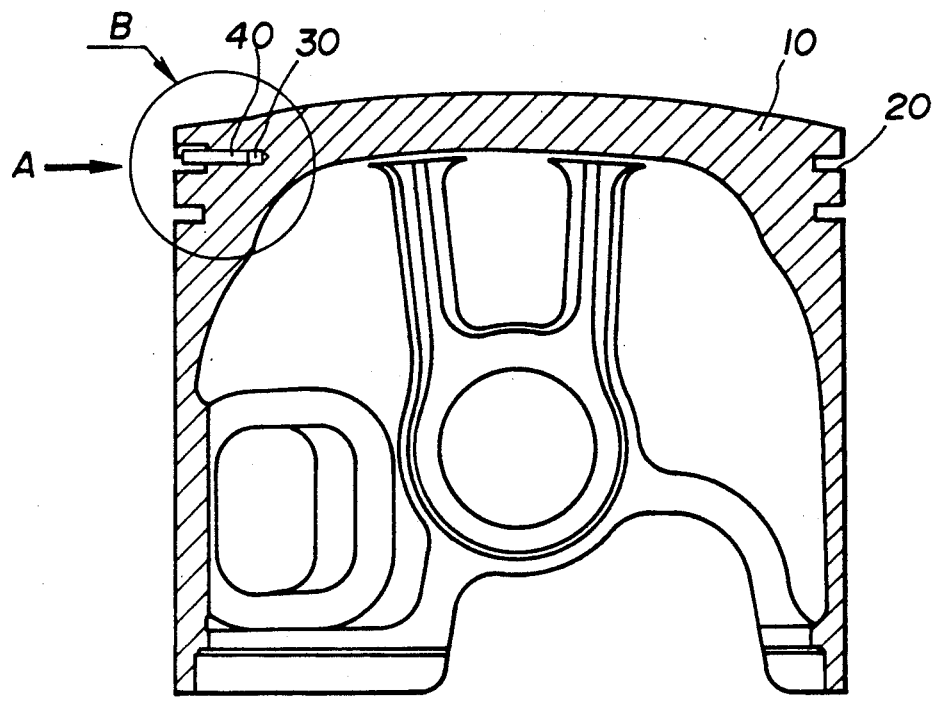
FIG. 1 is a sectional view of a piston with a knock pin, according to the present invention.
Figure 2:
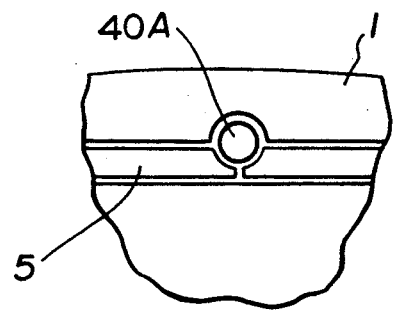
FIG. 2 is an enlarged fragmentary view showing FIG. 1 in the direction of an arrow A with a piston ring installed.

Referring now to the drawings, particularly to FIGS. 1 and 2, FIG. 1 shows a piston 10, with a circumferentially extending piston ring groove 20 formed therein. A knock pin bore 30 is formed which extends longitudinally in the radial direction of the piston 10. In FIG. 2, an enlarged fragmentary view of the encircled portion of FIG. 1 is shown, viewed in the direction of the arrow A of FIG. 1, showing a head 40A of a knock ring 40 inserted in a piston 1 with a piston ring 5 installed in a ring groove of the piston 1.

Figure 3:
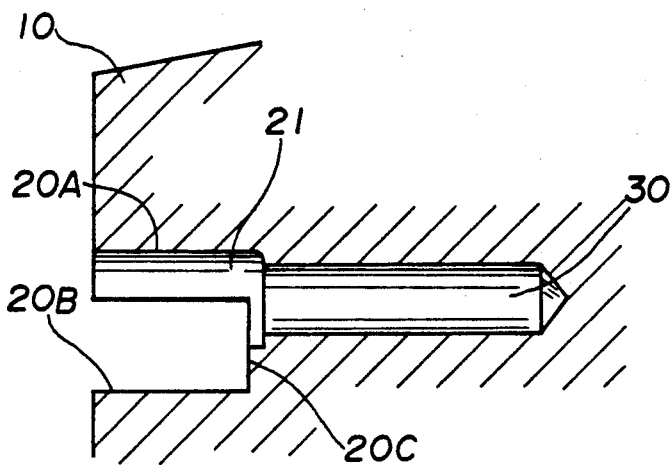
FIG. 3, is an enlarged fragmentary view of a portion of FIG. 1 encircled at B, showing a state in which the knock pin and the piston ring are removed.

FIG. 3 shows an enlarged fragmentary view of the knock pin bore according to the present invention. It can be seen that the knock pin bore 30 is a blind ended bore in the radial direction of the piston and that the bore 30 opens to an inner wall 20C of the piston ring groove 20, proximate an upper wall 20A thereof.

Figure 4:
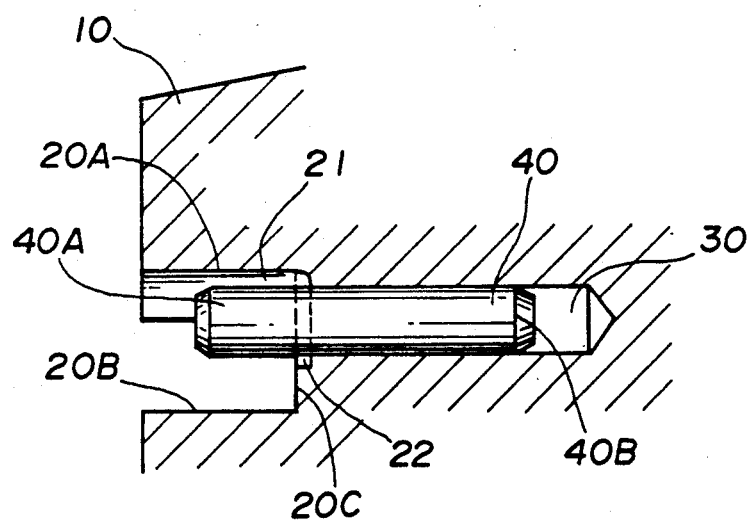
FIG. 4 is a view similar to FIG. 3 showing the knock pin in position.

In FIG. 4, a tail end 40B of a knock pin 40 is shown inserted into the knock pin bore 30. A head end 40A of the knock pin 40 projects into a space defined by upper wall 20A, lower wall 20B and inner wall 20C of the piston ring groove. Accordingly, a height of the inner wall 20C will be understood to be greater than the width of the knock pin bore 30. It will be noted that in the present embodiment, the knock pin bore 30 is oriented toward the upper wall 20A of the piston ring groove 20.

As seen in FIG. 4, when the knock pin 40 is inserted into the knock pin bore 30, around the head end 40A of the knock pin 40, a gap portion 21 remains. The gap portion 21 is formed in alignment with the knock pin bore 30 and is of a diameter larger than the knock pin bore 30. Alternatively, the gap portion 21 may be formed coaxially with the knock pin bore 30, with a larger diameter, and inset so as to form a circular clearance 22, around the circumference of the protruding head end of the knock pin 40 and inset from a surface of the inner wall 20C of the piston ring groove. At one side, the circular clearance 22 merges with the gap portion 21 such that the head end 40A of the knock pin 40 stands free of contact with the piston 10 or with the walls 20A, 20B and 20C of the piston ring groove. The size of the gap portion 21 is determined such that a gap exists between the circumference of the head end 40A of the knock pin 40, and the upper surface of the gap portion 21, such that the protruding head end 40A can remain isolated from contact with the piston 10 or with the walls 20A, 20B and 20C of the piston ring groove under engine running conditions.

In other words, the knock pin arrangement of the present invention can suitably prevent a knock pin from being subject to stress caused by piston expansion due to temperature and so forth by isolating the head end of the knock pin from contact with surrounding surfaces.

Figure 5:
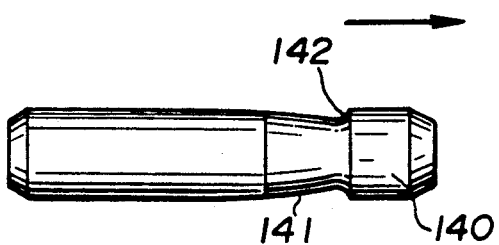
FIG. 5 is a plan view of an alternative embodiment of a knock pin.

FIG. 5 shows an alternative embodiment of a knock pin according to the present invention. According to this embodiment, a knock pin 140 is characterized by a neck portion 141 which tapers in an insertion direction (arrow direction in FIG. 4) of the knock pin 140. The neck portion is adjacent a cap portion 142. The knock pin 140 may, for example, be integrally formed of a single material chosen to minimize a difference in thermal expansion coefficients between the knock pin 140 and the piston 10. The knock pin 140, with the neck portion 141 and the cap portion 142 provides excellent physical resistance properties for suitable durability and wear under various engine operating conditions and further, resists forces which would extract the knock pin 140 from the knock pin bore 30.

As noted above, the thermal expansion coefficients of the knock pin 140 and the piston 1 are selected so that binding, or friction, between the knock pin 140 and the knock pin bore 30, caused by rising of piston temperature during engine running, is suitably prevented.

Also, according to the present invention, although the neck portion 141 and cap portion 142 are shown formed on only one part of the knock pin 140, they may alternatively be formed on a plurality of portions thereof.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A piston comprising:

a piston head formed with a piston ring groove and a knock pin bore, said piston ring groove having upper and lower walls and an inner wall which cooperatively define said piston ring groove, said knock pin bore being communicated with said piston ring groove;

a knock pin received in said knock pin bore and having an emergent portion protruding into said piston ring groove;

means for preventing mechanical interference between said emergent portion and said upper, lower, and inner walls of said piston ring groove, wherein said means for preventing mechanical interference includes a recessed gap portion circumferentially surrounding a longitudinal shaft portion of said knock pin where said knock pin is emergent from said knock pin bore.

2. A piston as set forth in claim 1, wherein said knock pin bore has an opening within said inner wall disposed toward one of said upper and lower walls from an equidistant point between said upper and lower walls.

3. A piston as set forth in claim 1, wherein said knock pin bore is set in a transverse direction relative an axis of said piston.

4. A piston as set forth in claim 1, wherein said knock pin has a head end terminating said emergent portion and a tail end inserted into said knock pin bore, at least one of said head and tail end being beveled.

5. A piston as set forth in claim 1, wherein said knock pin has a neck portion of a smaller diameter than a head end and a tail end thereof, said neck portion tapering in an insertion direction of said knock pin and, a cap portion being further provided adjacent to an end of said neck portion at said insertion direction.

6. A piston as set forth in claim 3, wherein a portion of the circumference of said knock pin bore impinges on a line defined by a portion of at least one of said upper and lower walls of said piston ring groove.

7. A piston comprising:

a piston head formed with a piston ring groove and a knock pin bore, said piston ring groove having upper and lower walls and an inner wall which cooperatively define said piston ring groove, said knock pin bore being communicated with said piston ring groove;

a knock pin received in said knock pin bore and having an emergent portion protruding into said piston ring groove;

means for preventing mechanical interference between said emergent portion and said upper, lower, and inner walls of said piston ring groove;

wherein said knock pin bore has an opening within said inner wall disposed toward one of said upper and lower walls from an equidistant point between said upper and lower walls; and wherein said means for preventing mechanical interference comprises a second bore of a larger diameter than said knock pin bore, and communicating, in alignment with, said knock pin bore at said opening.

8. A piston as set forth in claim 7, wherein said second bore is coaxial with said knock pin bore.

9. A piston as set forth in claim 7, wherein a circumference of said second bore impinges on one of said upper and lower walls of said piston ring groove.

* * * * *